United States Patent [19]

Dillenschneider

[11] 4,080,481

[45] Mar. 21, 1978

[54] SPRAY DEVICE AND METHOD OF USING SAME

[75] Inventor: Jean-Paul Dillenschneider, Beaumont, France

[73] Assignee: Compagnie Generale des Etablissements Michelin, Clermont-Ferrand, France

[21] Appl. No.: 645,095

[22] Filed: Dec. 29, 1975

[30] Foreign Application Priority Data

Dec. 31, 1974 France .................................. 74 43538

[51] Int. Cl.² .......................... B05D 7/02; B05D 1/02; B05B 9/00
[52] U.S. Cl. .................................. 427/421; 222/464; 239/337; 427/140
[58] Field of Search ............... 427/421, 140, 385, 386; 239/337; 222/464

[56] References Cited

U.S. PATENT DOCUMENTS 2,450,503  10/1948  Drummond .................... 427/421 X

*Primary Examiner*—James R. Hoffman
*Attorney, Agent, or Firm*—Braumbaugh, Graves, Donohue & Raymond

[57] ABSTRACT

A spray device comprises an atomizing vessel containing therein a pressurized gaseous propellant and a sprayable fluid composition comprising a blend of two chemically reactive components and at least one volatile liquid product in an amount sufficient to prevent any chemical reaction between the two chemically reactive components until such time as the fluid composition is sprayed from the spray device.

9 Claims, 1 Drawing Figure

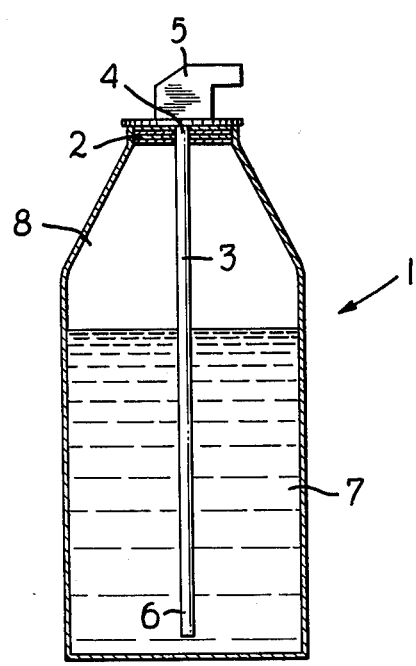

SPRAY DEVICE AND METHOD OF USING SAME

The present invention relates to devices intended to deposit a sprayed fluid composition onto a physical surface on which it is to solidify. More particularly, it concerns spray devices intended to spray a fluid composition resulting from the mixing of two reactive components capable of reacting with each other under well defined conditions, this reaction being of the homopolymerization, copolymerization, vulcanization, cross-linking, condensation or polycondensation type. By spray devices there are understood not only the mechanical members intended to contain, carry and spray the said fluid composition but also the charge of the fluid composition contained in the said members.

In the known spray devices the two reactive components are contained in two separate reservoirs. Under the effect of a gas under pressure the two reactive components arrive, through separate tubes, from their respective reservoirs to the atomizer where they are mixed. The mixture thus formed is then sprayed onto the surface to be treated.

A variant embodiment of such spray devices consists in providing one reservoir within the other. This latter reservoir constitutes the outer housing of the appratus and supports the atomizer. In addition to the inner reservoir which is filled with one of the two reactive components, it contains the tube which connects said inner reservoir to the atomizer, the second reactive component, a tube which dips into said second reactive component and extends to the atomizer and a charge of propellant gas under pressure occupying the space defined by the wall of the outer housing and the above enumerated elements located within said housing. The purpose of the propellant gas under pressure is to propel the two reactive components towards the atomizer by action, on the one hand, on the free surface of the second reactive component and, on the other hand, on the wall of the inner reservoir. For this reason the wall of the inner reservoir must be formed of a flexible material. Furthermore, this material must be impermeable with respect to the second reactive component in contact with the wall of the inner reservoir. The same is true of the material constituting the connecting tube to the atomizer. Therefore, the cost of such spray devices is relatively high.

The object of the present invention is to eliminate the said inner reservoir in the spray devices described above and to provide fluid compositions comprising two reactive components which are reactive with one another but at a concentration which for a considerable period of time excludes any reaction prior to the atomization of the said fluid composition. One thus has spray devices which are ready for use but are capable of being manufactured many months before their use.

Thus the spray device in accordance with the invention comprises a single impermeable reservoir resistant to the presence of a propellant gas, impermeably connected to an atomizer and, within the lower portion of said reservoir, a fluid composition to be sprayed, a tube one end of which is connected to the atomizer and the other end is immersed in the fluid composition to be sprayed and, in the free space above the fluid composition within the single reservoir, a propellant gas or a mixture of propellant gases under a pressure greater than the ambient atmospheric pressure. This device is characterized by the fact that the fluid composition to be sprayed comprises a blend of (1) two reactive components capable of homopolymerizing, copolymerizing, vulcanizing, cross-linking, condensing or polycondensing when they are alone in the presence of each other, and (2) a product or mixture of products in liquid state under the pressure prevailing in the reservoir and volatile at ambient atmospheric pressure and temperature, the proportions of this liquid product or mixture of liquid products with respect to the two reactive components being such that they prevent any chemical reaction of said two reactive components with each other.

In other words, in accordance with the invention the said liquid product or mixture of liquid products is used to place the two reactive components of the fluid composition to be sprayed into solution or dispersion, the presence of the said liquid product or mixture of liquid products in suitable proportions in the fluid composition to be sprayed preventing the reaction of the two reactive components as long as the said liquid product or mixture of liquid products has not evaporated into the ambient atmosphere after the spraying of the fluid composition.

It goes without saying that the invention includes the case in which the said liquid product or mixture of liquid products used to place the two reactive components of the fluid composition to be sprayed in solution or in dispersion is used as the propellant gas exerting the atomization pressure on the fluid composition contained in the reservoir of the spray device.

In accordance with the invention, the said liquid product or mixture of liquid products forming part of the fluid composition to be sprayed should be selected in such a manner that it is in liquid state under the pressure prevailing in the reservoir and that it volatilizes easily at ambient atmospheric pressure and temperature, for instance, as from the moment when the droplets of the sprayed fluid composition deposit on the surface to be treated. Thus the liquid products capable of being used in pure state or in the state of a mixture in the spray devices of the type under consideration are in general paraffinic, aromatic or naphthenic hydrocarbons whether or not saturated and whether or not halogenated and more particularly fluorinated and/or chlorofluorinated hydrocarbons, such as, monofluorotrichloromethane, difluorodichloromethane, trifluoromonochloromethane, monofluorodichloromethane, difluoromonochloromethane, monofluoromonochloromethane, monofluoromethane, and monochloromethane. In the event that the said liquid product or mixture of liquid products is used only to place the two reactive components of the fluid composition in solution or in dispersion, it is advantageous to use an inexpensive propellant gas, such as, nitrous oxide, as the propellant gas which exerts on the fluid composition the pressure necessary for the atomizing thereof.

The invention also extends to processes of homopolymerization, copolymerization, vulcanization, cross-linking, condensation, or polycondensation at a temperature close to ambient atmospheric temperature, carried out by means of the spray device in accordance with the invention. These processes are characterized by the fact that in a first step a fluid composition is formed within an impermeable enclosure by blending two reactive components capable of reacting with each other to form a final homopolymerized, copolymerized, vulcanized, cross-linked, condensed, or polycondensed reaction product, with a quantity of a liquid product or mixture of liquid products sufficient to prevent the reaction of the two reactive components, this liquid product or mixture of liquid products being volatile at ambient atmospheric pressure and temperature, and characterized by the fact that in a second step, the fluid composition thus obtained is spread, preferably by spraying under the pressure of a propellant gas, onto a physical surface, and in particular onto articles of rubber, for instance, rubber tires.

The drawing accompanying the present specification schematically illustrates by way of example a spray device in accordance with the invention.

The FIGURE shows a reservoir 1 closed tightly by a stopper 2. A tube 3 passes through the stopper 2. The end 4 of the tube 3 located outside the reservoir 1 is provided with an atomizer 5 the details of which are not shown. The other end 6 of the tube 3 dips into the fluid composition 7 to be sprayed in accordance with the invention which is contained in the reservoir 1 and partially fills it. The free space 8 above the fluid composition 7 within the reservoir 1 is filled with a propellant gas or a mixture of propellant gases under a pressure greater than the surrounding atmospheric pressure.

The present specification also includes the indication of a number of formulas of two reactive components capable of being sprayed in the form of fluid compositions in accordance with the invention, these formulas being indicated by way of illustration and not of limitation.

EXAMPLE 1

This example concerns a paint which vulcanizes at ambient temperature.

A vulcanizable Component $A_1$ is prepared which contains, per 1,000 g.:

| | |
|---|---|
| halogenated butyl or neoprene rubber | 129.8 g. |
| talc | 45.4 g. |
| titanium oxide | 60.5 g. |
| zinc oxide | 6.4 g. |
| stearic acid | 1.2 g. |
| MBTS (mercaptobenzothiazole disulfide) | 0.9 g. |
| modified alkylphenol disulfide | 1 g. |
| colored pigment | 42.8 g. |
| heptane | 712 g. |

Thereupon the cross-linking agent Component $B_1$ is prepared which contains, per 1,000 g.:

| | |
|---|---|
| piperidine pentamethylene dithiocarbamate | 3.7 g. |
| MBT (mercaptobenzothiazole) | 0.9 g. |
| cyclohexanol | 140.2 g. |
| heptane | 855.2 g. |

EXAMPLE 2

This example concerns an elastomer solution intended for the repair of rubber articles, which vulcanizes at ambient temperature.

A vulcanizable Component $A_2$ is prepared which contains, per 1,000 g.:

| | |
|---|---|
| natural or synthetic rubber | 106.2 g. |
| ISAF black | 42.5 g. |
| aromatic oil | 31.8 g. |
| antioxidant | 2.1 g. |
| active zinc oxide | 5.3 g. |
| stearic acid | 1.1 g. |
| paraffin | 0.5 g. |
| urea | 0.5 g. |
| heptane or octane | 810 g. |

The formula of the cross-linking agent Component $B_2$ is the following, per 1,000 g.:

| | |
|---|---|
| polyisobutylene | 78.2 g. |
| aromatic oil | 47.4 g. |
| active zinc oxide | 118.5 g. |
| zinc isopropylxanthate | 47.4 g. |
| sulfur | 88.5 g. |
| heptane or octane | 620 g. |

EXAMPLE 3

This example relates to the condensation and cross-linking of a resin at ambient temperature.

Component $A_3$ results from the dissolving in a solvent such as acetone or acetate of ethylene glycol in an amount, variable (preferably 5 parts) by weight in accordance with the desired viscosity, of an epoxy resin of the bisphenol A diglycidyl ether type in 100 parts of the solvent.

Component $B_3$ results from the dissolving in a solvent such as acetone or acetate of ethylene glycol in an amount, variable (preferably 50 parts) by weight in accordance with the desired viscosity, of an amine of the diethylenetriamine type in 100 parts of the solvent.

EXAMPLE 4

This example relates to the polycondensation and cross-linking of a polyester resin at ambient temperature.

The Component $A_4$ is obtained by dissolving in styrene, in a concentration of between 30 and 40 parts by weight, of propylene glycol phthalate-fumarate (resin) per 100 parts of styrene.

The Component $B_4$ is obtained by dissolving a quantity, which varies by weight depending on the desired viscosity, of methylethylketone peroxide in 100 parts of an alcohol, for instance ethanol.

EXAMPLE 5

This example concerns the polycondensation of a polymer having a reactive chain end with a suitable reagent.

In order to obtain the Component $A_5$, 10 parts by weight of a diene elastomer of an average molecular weight equal to about 3,000, the chains of which are terminated by acid chloride functions, are dissolved in 100 parts of a hydrocarbon solvent, for instance heptane.

The Component $B_5$ results from dissolving 0.2 to 0.4 parts by weight of the following composition in 100 parts of a solvent, such as heptane:

| | |
|---|---|
| hexamethylenetriamine | 0.1 to 0.2 parts by weight |
| triethylamine | 0.1 to 0.2 parts by weight |

EXAMPLE 6

This example relates to polymerizations or copolymerizations of monomers that have a boiling point of more than 30° C., such as isoprene, styrene, phenyl-2-butadiene, etc., by radical catalysts, such as peroxides or compounds having an azo group, the threshold of decomposition of which may be reached at ambient temperature in the presence of a suitable accelerator.

Component $A_6$ can, for instance, be formed by a solution of:

| | |
|---|---|
| isoprene | 80 parts by weight |
| styrene | 20 parts by weight |
| benzoyl peroxide | 0.2 parts by weight |

Component $B_6$ results from dissolving 0.2 parts by weight of dimethylaniline in 100 parts of sytrene.

EXAMPLE 7

This example concerns an elastomer solution intended to impermeabilize or repair rubber articles, vulcanizing at ambient temperature.

1,000 g. of Component $A_7$ contain:

| | |
|---|---|
| natural or synthetic rubber or mixture of the two | 107.3 g. |
| poly-paradinitrosobenzene | 0.4 g. |
| ISAF black | 21.6 g. |
| rosin | 1.1 g. |
| parabenzoquinone dioxime | 39.6 g. |
| ZnO | 10.6 g. |
| stearic acid | 4.4 g. |
| heptane or octane | 815.0 g. |

1,000 g. of Component $B_7$ contain:

| | |
|---|---|
| natural or synthetic rubber or mixture of the two | 134.0 g. |
| poly-paradinitrosobenzene | 0.3 g. |
| SRF black | 25.5 g. |
| rosin | 6.3 g. |
| $PbO_2$ | 18.9 g. |
| heptane or octane | 815.0 g. |

EXAMPLE 8

This example concerns another self-vulcanizing paint.

1,000 g. of Component $A_8$ contain:

| | |
|---|---|
| natural or synthetic rubber or a mixture of the two | 125 g. |
| ZnO | 25 g. |
| chalk | 25 g. |
| dye | 75 g. |
| $TiO_2$ | 25 g. |
| sulfur | 25 g. |
| heptane or octane | 700 g. |

1,000 g. of Component $B_8$ contain:

| | |
|---|---|
| zinc isopropylxanthate | 25 g. |
| urea | 10 g. |
| mercaptobenzothiazole | 15 g. |
| cyclohexanol | 395 g. |
| heptane or octane | 550 g. |
| acetone | 5 g. |

The following table indicates how many parts by weight of Components $A_1$ to $A_8$ and $B_1$ to $B_8$ are to be dissolved or dispersed in 100 parts by weight, for instance, of monofluorotrichloromethane or of a mixture of monofluorotrichloromethane (40%) and difluorodichloromethane (60%).

| Components | Parts by Weight |
|---|---|
| $A_1$ | 15 of a 33% solution in monofluorotrichloromethane |
| $B_1$ | 5 of pure component |
| $A_2$ | 15 $A_2$ and $B_2$ being each diluted to 33% in monofluorotrichloromethane |
| $B_2$ | 5 of pure component |
| $A_3$ | 10, if the preferential concentrations cited above for $A_3$ and $B_3$ are used |
| $B_3$ | 10 of pure component |
| $A_4$ | quantity equivalent to 100 parts by weight of resin |
| $B_4$ | quantity equivalent to 1.5 parts by weight of peroxide. A mixture $A_4 + B_4$ is prepared and 20 parts by weight of this mixture are dissolved in 100 parts of the above solvent. |
| $A_5$ | 15 of a 33% solution in monofluorotrichloromethane |
| $B_5$ | 5 of pure component |
| $A_6$ | 10 of pure component |
| $B_6$ | 10 of pure component |
| $A_7$ | 10, $A_7$ and $B_7$ being each diluted to 33% in monofluorotrichloromethane |
| $B_7$ | 10 of pure component |
| $A_8$ | 15 of a 33% solution in monofluorotrichloromethane |
| $B_8$ | 5 of pure component |

The liquid product or mixture of liquid products in accordance with the invention is used in a proportion such that the two reactive components capable of homopolymerizing, copolymerizing, vulcanizing, crosslinking, condensing or polycondensing constitute from about 0.1% to about 50% by weight of the fluid composition to be sprayed, and preferably from about 7% to about 10%.

The fluid composition and propellant gas or gases are charged into the spray device in conventional manner.

The use of the spray device and of the processes in accordance with the invention makes it possible to readily apply to physical surfaces of small size small amounts of coloring paints, solutions, glues and protective coatings of very different nature without it being necessary to mix the components and to use the total amount of the mixture or, if the quantity mixed is too great, to consider the unused quantity as waste.

The spray device and processes in accordance with the invention are particularly suitable for painting sidewalls of automobile tires, for sealing holes in tires, in particular, of the airtight rubber covering of tubeless tires, etc.

What is claimed is:

1. A spray device comprising a single impermeable reservoir resistant to the pressure of a propellant gas, impermeably connected to an atomizer and, within the lower portion of said reservoir, a fluid composition to be sprayed, a tube one end of which is connected to the atomizer and the other end is immersed in the fluid composition to be sprayed and, in the free space above the fluid composition within the single reservoir, at least one propellant gas under a pressure greater than the ambient atmospheric pressure, characterized by the fact that the fluid composition to be sprayed comprises a blend of (1) two reactive components capable of homopolymerizing, copolymerizing, vulcanizing, cross-linking, condensing or polycondensing when they are alone in the presence of each other, and (2) of at least one product in liquid state under the pressure prevailing in the reservoir and volatile at ambient atmospheric pressure and temperature, the proportions of this liquid product with respect to the two reactive components being such that they prevent any chemical reaction of the said two reactive components with each other.

2. The spray device according to claim 1, characterized by the fact that the liquid product present in the fluid composition to be sprayed is different from the propellant gas in the free space above the fluid composition within the single reservoir.

3. The spray device according to claim 1, charracterized by the fact that the two reactive components are dissolved or dispersed in the liquid product.

4. The spray device according to claim 1, characterized by the fact that the fluid composition contains as the liquid product at least one material selected from the group consisting of monofluorotrichloromethane and difluorodichloromethane.

5. The spray device according to claim 1, characterized by the fact that the two reactive components constitute from about 0.1% to about 50% by weight of the fluid composition to be sprayed.

6. The spray device according to claim 5, characterized by the fact that the two reactive components constitute from about 7% to about 10% by weight of the fluid composition to be sprayed.

7. A process for homopolymerization, copolymerization, vulcanization, cross-linking, condensation or polycondensation at a temperature close to ambient atmospheric temperature, characterized by the fact that in a first step a fluid composition is formed within an impermeable enclosure by blending two reactive components capable of reacting with each other to form a final homopolymerized, copolymerized, vulcanized, cross-linked, condensed or polycondensed reaction product, with a quantity of at least one liquid product sufficient to prevent the reaction of the two reactive components, the liquid product being volatile at ambient atmospheric pressure and temperature, and characterized by the fact that in a second step the fluid composition thus obtained is spread onto a surface, whereby said two reactive components react with each other to form a final homopolymerized, copolymerized, vulcanized, cross-linked, condensed or polycondensed reaction product.

8. The process according to claim 7, characterized by the fact that the fluid composition is spread onto a surface by spraying the fluid composition under pressure of at least one pressurized propellant gas in a free space above the fluid composition within said impermeable enclosure.

9. The process according to claim 7, characterized by the fact that the liquid product is at least one material selected from the group consisting of monofluorotrichloromethane and difluorodichloromethane.

* * * * *